United States Patent
Rao et al.

(10) Patent No.: US 12,118,084 B2
(45) Date of Patent: Oct. 15, 2024

(54) AUTOMATIC SELECTION OF DATA FOR TARGET MONITORING

(71) Applicant: Capital One Services, LLC, McLean, VA (US)

(72) Inventors: Phanindra Rao, Celina, TX (US); Peter Gaspare Terrana, Mechanicsville, VA (US); Vannia Gonzalez Macias, Glen Allen, VA (US)

(73) Assignee: Capital One Services, LLC, McLean, VA (US)

( * ) Notice: Subject to any disclaimer, the term of this patent is extended or adjusted under 35 U.S.C. 154(b) by 231 days.

(21) Appl. No.: 17/822,158

(22) Filed: Aug. 25, 2022

(65) Prior Publication Data

US 2024/0070269 A1 Feb. 29, 2024

(51) Int. Cl.
*G06F 15/16* (2006.01)
*G06F 9/54* (2006.01)
*G06F 21/55* (2013.01)
*H04L 29/06* (2006.01)

(52) U.S. Cl.
CPC ...... *G06F 21/554* (2013.01); *G06F 2221/034* (2013.01)

(58) Field of Classification Search
CPC .......................... G06F 21/554; G06F 2221/034
USPC .......................................................... 706/23
See application file for complete search history.

(56) References Cited

U.S. PATENT DOCUMENTS

| | | | | |
|---|---|---|---|---|
| 10,621,346 B1* | 4/2020 | Singh | .................... | H04L 9/3239 |
| 10,673,880 B1* | 6/2020 | Pratt | .................... | H04L 63/1425 |
| 11,294,756 B1* | 4/2022 | Sadrieh | .................. | G06N 3/047 |
| 11,455,392 B2* | 9/2022 | Basak | .................. | G06F 21/566 |
| 11,588,834 B2* | 2/2023 | Bowditch | ............. | H04L 67/306 |
| 2011/0119374 A1* | 5/2011 | Ruhl | ...................... | G06Q 10/06 709/224 |
| 2014/0032506 A1* | 1/2014 | Hoey | .................... | G06F 16/215 707/691 |
| 2017/0063905 A1* | 3/2017 | Muddu | .................. | G06N 5/022 |
| 2017/0329660 A1* | 11/2017 | Salunke | .............. | G06F 11/3409 |
| 2018/0219889 A1* | 8/2018 | Oliner | ...................... | G06N 3/04 |
| 2019/0079994 A1* | 3/2019 | Ma | ........................ | G06F 16/2379 |
| 2019/0155672 A1* | 5/2019 | Wang | ...................... | G06F 17/18 |
| 2019/0236177 A1* | 8/2019 | Jain | ........................ | G06F 16/2365 |
| 2019/0379589 A1* | 12/2019 | Ryan | ...................... | G06F 17/142 |
| 2020/0073740 A1* | 3/2020 | Ohana | .................. | G06F 11/0793 |

(Continued)

*Primary Examiner* — Hamza N Algibhah
(74) *Attorney, Agent, or Firm* — Foley & Lardner LLP

(57) ABSTRACT

Methods and systems are described herein for determining auxiliary parameters within datasets, the auxiliary parameters being used to segregate the datasets such that anomaly detection may be performed on the segregated datasets. Based on anomaly detection, alert conditions may then be identified. In particular, a system may, using a machine learning model, determine for a particular target feature (e.g., a parameter being monitored) one or more auxiliary features (other parameters) that effect the values of that parameter and transmit the target feature and the auxiliary features in a message to a monitoring system indicating which features to monitor. The collected data may then be received by the system and transformed into a timeseries dataset, which may then be used to detect anomalies within the data and thereby identify any anomalous points.

20 Claims, 8 Drawing Sheets

(56) References Cited

U.S. PATENT DOCUMENTS

| | | | |
|---|---|---|---|
| 2020/0202256 A1* | 6/2020 | Chaudhari | G06F 18/23 |
| 2020/0285737 A1* | 9/2020 | Kraus | G06F 21/552 |
| 2020/0351283 A1* | 11/2020 | Salunke | H04L 63/1425 |
| 2020/0387797 A1* | 12/2020 | Ryan | G06N 3/084 |
| 2021/0019300 A1* | 1/2021 | Marathe | G06F 11/3419 |
| 2021/0056430 A1* | 2/2021 | Wu | G06N 3/006 |
| 2021/0089927 A9* | 3/2021 | Ryan | G06F 11/0754 |
| 2021/0216848 A1* | 7/2021 | Poghosyan | G06F 11/3006 |
| 2021/0349897 A1* | 11/2021 | Pierri | G06F 11/079 |
| 2021/0406671 A1* | 12/2021 | Gasthaus | G06F 11/2263 |
| 2022/0215091 A1* | 7/2022 | Dangoor | G06F 21/554 |
| 2022/0229903 A1* | 7/2022 | Manevitz | G06F 17/16 |
| 2022/0342860 A1* | 10/2022 | Gonzalez Macias | G06F 21/552 |
| 2023/0075065 A1* | 3/2023 | Ivenso | G06N 20/00 |

* cited by examiner

| Record ID | Bytes Read | Folder ID | System ID | TimeStamp |
|---|---|---|---|---|
| 1 | 1124 | Folder_A | System_1 | 01:01:01 |
| 2 | 1126 | Folder_A | System_1 | 01:01:02 |
| 3 | 1175 | Folder_B | System_2 | 01:02:01 |
| 4 | 1134 | Folder_B | System_2 | 01:01:04 |
| 5 | 7777 | Folder_A | System_1 | 01:01:04 |

FIG. 2

Figure 3:
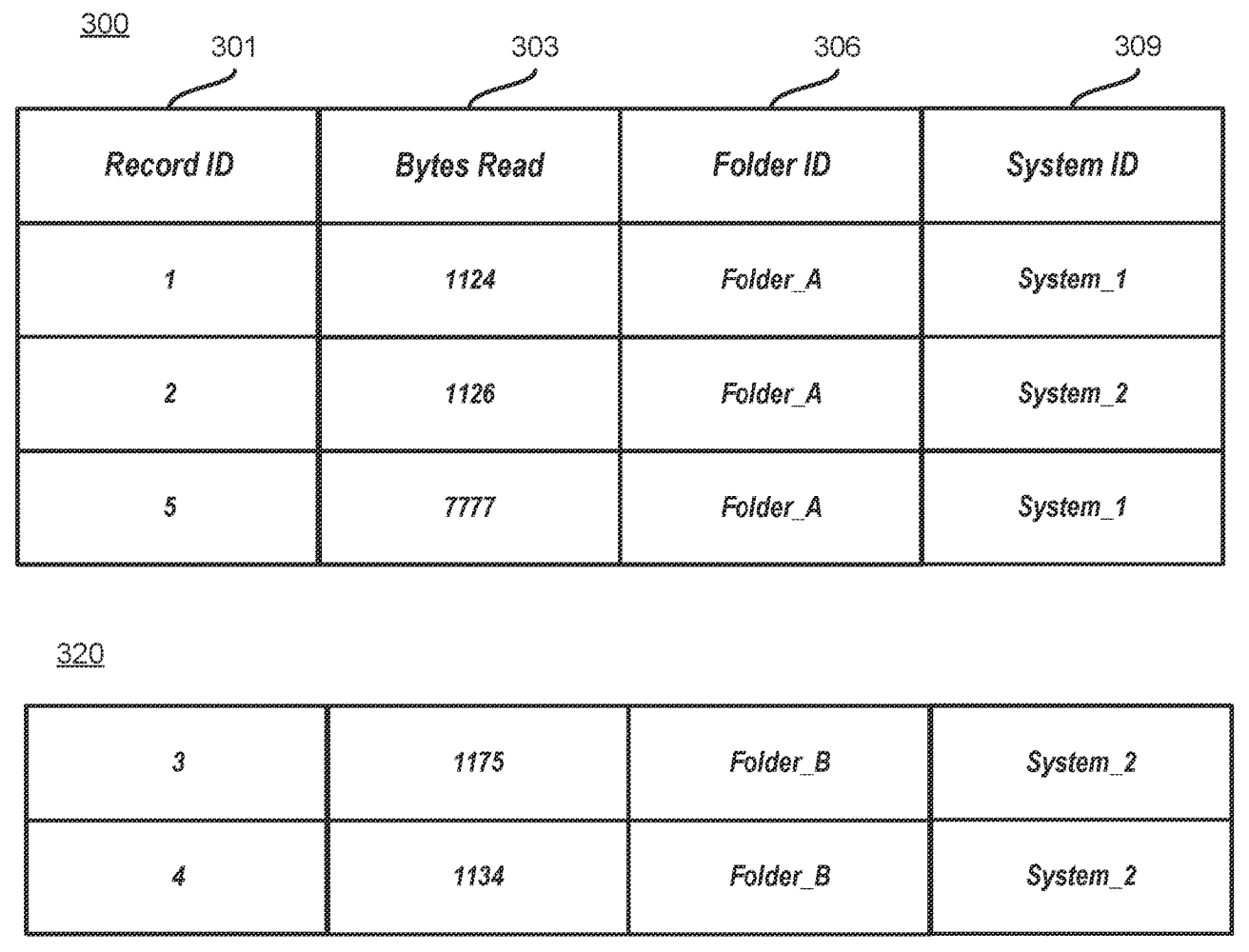

| Record ID | Bytes Read | Folder ID | System ID |
|---|---|---|---|
| 1 | 1124 | Folder_A | System_1 |
| 2 | 1126 | Folder_A | System_2 |
| 5 | 7777 | Folder_A | System_1 |

300

| | | | |
|---|---|---|---|
| 3 | 1175 | Folder_B | System_2 |
| 4 | 1134 | Folder_B | System_2 |

| Record ID | Bytes Read | Folder ID | System ID |
|---|---|---|---|
| 1 | 1124 | Folder_A | System_1 |
| 5 | 7777 | Folder_A | System_1 |

420

| | | | |
|---|---|---|---|
| 3 | 1175 | Folder_B | System_2 |
| 4 | 1134 | Folder_B | System_2 |

440

| | | | |
|---|---|---|---|
| 2 | 1126 | Folder_A | System_2 |

| Record ID | Mean CashOut | Month | FICO |
|---|---|---|---|
| 1 | AA_1 | January | 620 |
| 5 | AA_2 | January | 640 |

620

| | | | |
|---|---|---|---|
| 3 | BB_1 | February | 730 |
| 4 | BB_2 | February | 740 |

640

| | | | |
|---|---|---|---|
| 2 | CC_1 | March | 810 |
| 6 | CC_2 | March | 815 |
| 7 | CC_3 | March | 820 |

FIG. 6

AUTOMATIC SELECTION OF DATA FOR TARGET MONITORING

BACKGROUND

Monitoring systems have become essential to many enterprises. Monitoring systems are currently used in many environments, including for performance monitoring, security monitoring, and financial monitoring, among others. For example, identifying cybersecurity events is crucial to any enterprise, even if a cybersecurity event is identified after its occurrence. However, identifying cybersecurity events has been difficult, as bad actors use ever more sophisticated attacks against computer systems. Thus, enterprises store as much data as possible so that data can be reviewed at a later time. This may cause excessive usage of computing resources (e.g., storage), especially in situations where enterprises are very large and are forced to store enormous amounts of data. Some of the data may be useful to identify issues. However, in many cases, certain data may not be useful. Thus, purging that data would enable enterprises to use less resources. Even in those circumstances, enterprises tend to save all the data, as fear of losing vital data forces these enterprises to err on the side of caution. In some cases, this issue stems from enterprises not being able to understand which monitoring parameters (e.g., monitoring data) are needed for a particular target and which data is not needed.

SUMMARY

This is particularly important for monitoring systems that use anomaly detection to identify alert conditions. For example, an enterprise may desire to monitor a number of bytes read for computing systems within the enterprise. This may be useful for identifying intruders when a large number of bytes is read within a particular request or within a short period of time. Thus, anomaly detection may be used for this purpose as anomalous (or unusually high) number of bytes read may indicate an intruder. However, determining what an anomalous number of bytes is may be difficult because for one computer system, that number may be different than for another computer system. In some cases, that number may be different based on different locations of computer systems. In all these cases, it may be difficult to identify anomalous values. To overcome this issue, it may be useful to segment the data into chunks. For example, it may be useful to separate the data based on the data that determines or affects the value of a particular parameter being monitored. One such segregation feature may simply be a computer name, because each computer system may have different usual (e.g., non-anomalous) bytes read values. Another parameter may be a folder name, as some folders are read from more than from others. Thus, it may be useful to segregate the data on both computer name and folder name. As a result of this, only the target data (e.g., bytes read) and the data needed to segment that target data (e.g., computer name) may need to be stored instead of all collected data.

Therefore, methods and systems are described herein for determining auxiliary parameters within datasets, the auxiliary parameters being used to segregate the datasets such that anomaly detection may be performed on the segregated datasets. Based on anomaly detection, alert conditions may then be identified. In particular, a system may, using a machine learning model, determine for a particular target feature (e.g., a parameter being monitored) one or more auxiliary features (other parameters) that effect the values of that parameter and transmit the target feature and the auxiliary features in a message to a monitoring system indicating which features to monitor. The collected data may then be received by the system and transformed into a timeseries dataset, which may then be used to detect anomalies within the data and thereby identify any anomalous points.

A parameter identification system may be used to perform these operations. The parameter identification system may determine a target feature of a base dataset. The base dataset may include a plurality of features and a plurality of entries. The parameter identification system may determine the target feature using one or more mechanisms. For example, the parameter identification system may receive the target feature from a monitoring system. In some embodiments, the parameter identification system may determine the target feature based on type (e.g., continuous features may be candidates). For example, in a scenario where the monitoring system monitors the number of bytes that are read, the target feature may be bytes read. In some embodiments, the parameter identification system may identify multiple target features. For example, the parameter identification system may identify, as a target feature, each continuous feature (e.g., includes numeric data as values). In some embodiments, the parameter identification system may generate target features based on aggregated metrics for one or more features of the dataset (e.g., average number of entries, average value, total value per time period, etc.).

The parameter identification system may input the base dataset and the target feature into a machine learning model to obtain one or more auxiliary features for the target feature. As discussed above, the parameter identifier system may identifier multiple target features. Accordingly, the parameter identifier system may input multiple target features into the machine learning model to obtain one or more auxiliary features for each target feature. The one or more auxiliary features may be selected by the machine learning model based on how well the one or more auxiliary features enable segmentation of the entries within the base dataset in relation to the target feature. For example, the auxiliary feature selection may be based on the population shift and/or performance change on the target due to population shift in one or more features or performance change in the residuals of the one or more auxiliary features as related to a particular target feature. To continue with the example above, if the target feature is bytes read, the auxiliary features may include number of access requests, a folder identifier, and/or another suitable feature.

The parameter identification system may then provide the target feature and the one or more auxiliary features to the monitoring system. For example, the parameter identification system may send a message to the monitoring system indicating that if a bytes read target feature is to be monitored, the monitoring system should collect data for the bytes read parameter and the one or more target features (e.g., computer name, folder name, etc.). The parameter identification system may then receive, from the monitoring system, a monitoring dataset for the target feature. The monitoring dataset may include a first set of auxiliary features for the target feature. For example, the dataset may include a plurality of events recorded on a plurality of computer systems. For each event, the data may include the target feature (e.g., bytes read) and the one or more auxiliary features (e.g., computer name, folder name, etc.). In some embodiments, the monitoring system may strip out other parameters. However, in some embodiments, the parameter identification system may strip the other parameters.

The parameter identification system may then aggregate and segment the target feature into a plurality of timeseries datasets based on an aggregation time interval and the one or more auxiliary features. For example, if the target feature is bytes read and the auxiliary features are computer name and folder name, the parameter identification system may segment the bytes read total for each combination of computer name and folder name. Furthermore, the parameter identification system may generate a timeseries dataset for each segment, for example, based on an hour as a time interval. The parameter identification system may then input the plurality of timeseries datasets into an anomaly detection model to identify one or more anomalies within the monitoring dataset. The detected anomalies may then be sent to the monitoring system for further analysis and determination of any actions that need to be performed.

Various other aspects, features, and advantages of the system will be apparent through the detailed description and the drawings attached hereto. It is also to be understood that both the foregoing general description and the following detailed description are examples, and not restrictive of the scope of the disclosure. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data), unless the context clearly dictates otherwise.

BRIEF DESCRIPTION OF THE DRAWINGS

FIG. 2 illustrates an excerpt of a dataset, in accordance with one or more embodiments of this disclosure.

FIG. 3 illustrates an excerpt of a segmented dataset, in accordance with one or more embodiments.

FIG. 4 illustrates another excerpt of the segmented dataset, in accordance with one or more embodiments.

FIG. 6 illustrates another excerpt of the segmented dataset, in accordance with one or more embodiments.

DETAILED DESCRIPTION

In the following description, for the purposes of explanation, numerous specific details are set forth in order to provide a thorough understanding of the disclosed embodiments. It will be appreciated, however, by those having skill in the art, that the embodiments may be practiced without these specific details, or with an equivalent arrangement. In other cases, well-known models and devices are shown in block diagram form in order to avoid unnecessarily obscuring the disclosed embodiments. It should also be noted that the methods and systems disclosed herein are also suitable for applications unrelated to source code programming.

Figure 1:
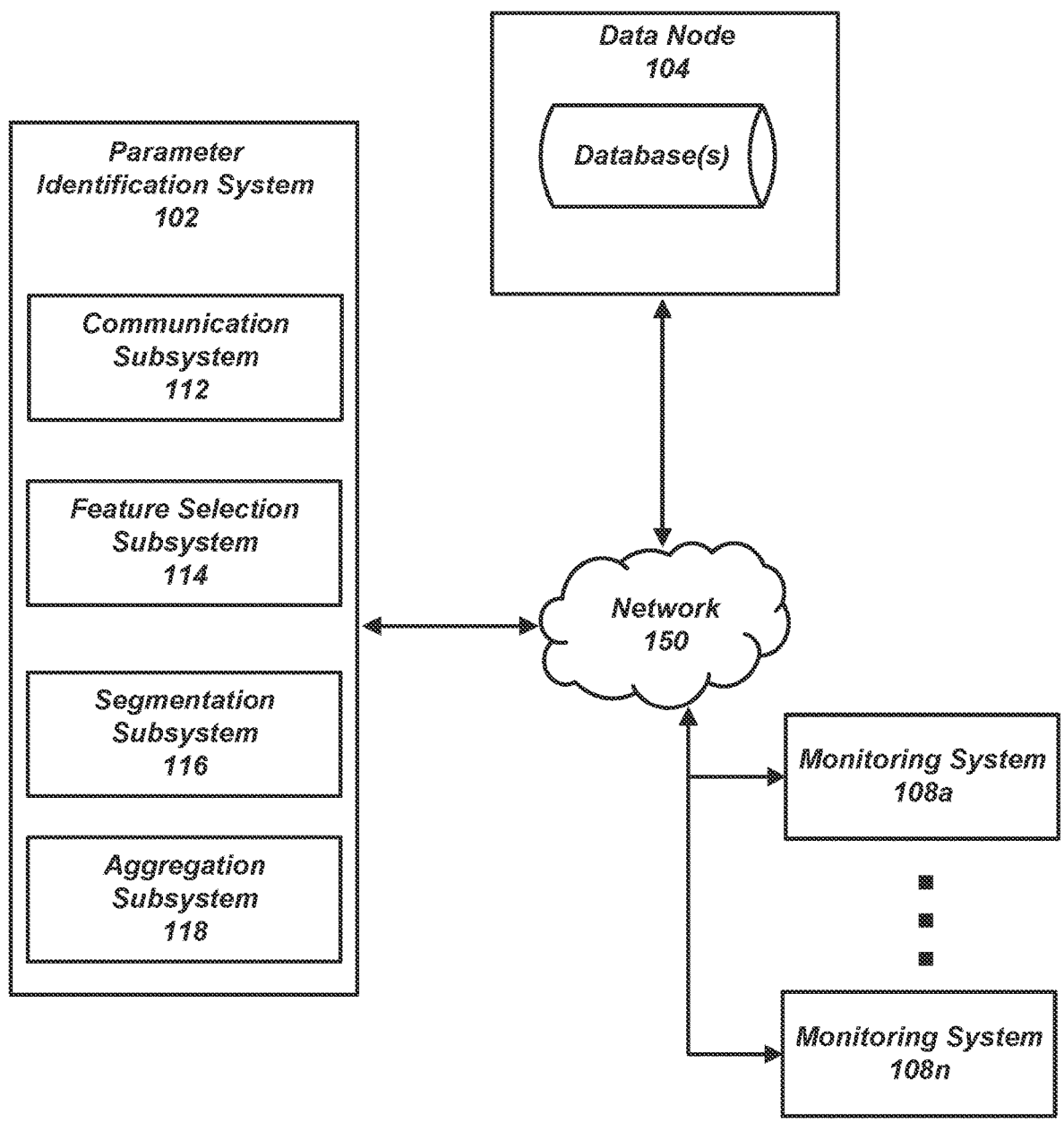
FIG. 1 shows an illustrative system for determining monitoring parameters and detecting anomalies within generated timeseries datasets, in accordance with one or more embodiments of this disclosure.

FIG. 1 shows environment 100, which includes a system for determining monitoring parameters and detecting anomalies within generated timeseries datasets. Environment 100 includes a parameter identification system 102, data node 104, and monitoring systems 108a-108n connected by network 150. Parameter identification system 102 may execute instructions for determining monitoring parameters and detecting anomalies within generated timeseries datasets. Parameter identification system 102 may include software, hardware, or a combination of the two. For example, parameter identification system 102 may be hosted on a physical server or a virtual server that is running on a physical computer system. In some embodiments, parameter identification may be part of a particular monitoring system and may be hosted together with one or more of monitoring systems 108a-108n.

Data node 104 may store various data (e.g., in one or more databases). For example, data node 104 may store various datasets (e.g., base datasets) for determining auxiliary and/or target parameters. Data node 104 may also store one or more machine learning models and may enable access for use and training of those machine learning models. In some embodiments, parameter identification system 102 may be hosted on data node 104. Data node 104 may include software, hardware, or a combination of the two. For example, data node 104 may be a physical server, or a virtual server that is running on a physical computer system. Network 150 may be a local area network, a wide area network (e.g., the Internet), or a combination of the two.

Monitoring systems 108a-108n may correspond to different monitoring systems that are hosted by an enterprise. For example, monitoring systems 108a-108n may include a monitoring system for monitoring performance of computing devices, a monitoring system for security monitoring, and/or a monitoring system for monitoring customers of the enterprise (e.g., cash out rates, credit scores, etc.). Each monitoring system may include software, hardware, or a combination of the two. For example, each of monitoring systems 108a-108n may be hosted on a physical server or a virtual server that is running on a physical computer system.

The mechanism for determining monitoring parameters and detecting anomalies within generated timeseries datasets may be initialized using a variety of methods. For example, a monitoring system (or another suitable system) may transmit a base dataset to parameter identification system 102 and identify one or more features of that base dataset that are being monitored (e.g., target features). In some embodiments, parameter identification system 102 may receive a request for a particular parameter or parameters to be processed (e.g., parameter(s) for which monitoring is required). In response, parameter identification system 102 may request a base dataset associated with this parameter. For example, data node 104 may store (e.g., in a database) a plurality of parameters that may be monitored and associated datasets. Data node 104 may transmit the base dataset to a device (e.g., server) hosting parameter identification system 102.

Parameter identification system 102 may receive the base dataset, for example, using communication subsystem 112. Communication subsystem 112 may include software components, hardware components, or a combination of both. For example, communication subsystem 112 may include a network card (e.g., a wireless network card and/or a wired network card) that is coupled with software to drive the card.

Communication subsystem 112 may pass the base dataset and/or any other information to feature selection subsystem 114.

In some embodiments, parameter identification system 102 may prune the base dataset. For example, parameter identification system 102 may remove any features that have little or no information. For example, if each value representing a particular feature is the same, that feature may not be useful. Thus, parameter identification system 102 may remove that feature. In addition, parameter identification system 102 may remove any information that is sensitive (e.g., names, addresses, social security numbers, etc.).

Feature selection subsystem 114 may include software components, hardware components, or a combination of both. For example, feature selection subsystem 114 may include software components that access data in memory and/or storage, and may use one or more processors to perform its operations. The feature selection subsystem may perform the operations described below. Feature selection subsystem 114 may determine a target feature of a base dataset. The base dataset may include a multitude of features and a multitude of entries. For example, FIG. 2 may illustrate an excerpt of a base dataset 200. Field 201 may store a record ID for identifying a record in the database. Field 203 may store bytes read, which may be a target feature. Field 206 and field 209 may store values for other features of the base dataset. Base dataset 200 may include other features that may be designated as target features. Field 215 may store timing information indicating when the data associated with each particular entry was generated. As discussed above, an indicator of the target feature or multiple target features may be received from a monitoring system or from another source. For example, feature selection subsystem 114 may determine that field 203 ("bytes read") corresponds to a requested target feature.

In some embodiments, feature selection subsystem 114 may identify one or more target features within the dataset automatically. Feature selection subsystem 114 may determine a corresponding data type associated with each feature of the base dataset. For example, feature selection subsystem 114 may iterate through each feature of the base dataset and determine whether the values are numerical, categorical, or of another data type. Field 203 corresponding to the "bytes read" feature may include (e.g., continuous variable) values, for example, "bytes read" may be a continuous variable, while field 206 that includes "Folder IDs" may be a categorical field (e.g., containing categories such as folder names). Field 209 may store "System ID" values corresponding, for example, to computer systems from where the data originated. Feature selection subsystem 114 may identify a set of features associated with a numerical (e.g., continuous) data type. For example, feature selection subsystem 114 may identify field 203 as a numerical data type field. In some embodiments, a dataset may include multiple numerical features (e.g., fields). Feature selection subsystem 114 may then select the target feature from the set of features associated with the numerical data type. In some embodiments, feature selection subsystem 114 may select multiple features as target features and process each target feature in parallel or in sequence.

In some embodiments, feature selection subsystem 114 may generate one or more target features from the dataset. For example, each entry in a dataset may correspond to a request with some of them being read requests. Each read request may include a plurality of values in corresponding fields (e.g., values in fields 201, 203, 206, and 209). For example, entry 212 may include a plurality of values, including "bytes read," "Folder ID," "System ID," and other suitable values. There may be thousands or millions of read requests in the base dataset. Thus, feature selection subsystem 114 may generate a new feature (e.g., a new field) with the base dataset for a number of read requests per hour, per minute, per day, or per another suitable time interval. In some embodiments, feature selection subsystem 114 may generate a new feature for a number of bytes read per hour or another suitable feature. These newly generated features may be target features.

In some embodiments, feature selection subsystem 114 may perform the following operations for generating a new feature. Feature selection subsystem 114 may determine a second aggregation time interval for the base dataset. Determining a segregation time interval is described later in this disclosure. Thus, feature selection subsystem 114 may use that method to select a time interval. In some embodiments, feature selection subsystem 114 may select any aggregation time interval or an aggregation time interval that was determined earlier. Feature selection subsystem 114 may then split, based on the second aggregation time interval, the plurality of entries into a plurality of subsets. For example, if the second aggregation time interval is one hour, feature selection subsystem 114 may split the dataset into a plurality of hourly datasets. That is, the entries within each dataset may correspond to the same hour (e.g., were recorded or have timestamps corresponding to the same hourly interval).

Feature selection subsystem 114 may determine, for a categorical feature of the base dataset, a corresponding count for each subset. For example, as shown in FIG. 3, if feature selection subsystem 114 may want to determine a number of accesses to "Folder_A" during each hour, feature selection subsystem 114 may calculate, for each hourly time interval, how many entries have "Folder_A" in field 306. Feature selection subsystem 114 may then add a new feature to the base dataset (e.g., corresponding to number of accesses to "Folder_A").

Feature selection subsystem 114 may input the base dataset and the target feature (or multiple target features) into a machine learning model to obtain one or more auxiliary features for the target feature. The one or more auxiliary features may be selected based on how well the one or more auxiliary features enable segmentation of the base dataset in relation to the target feature. For example, FIG. 3 illustrates an excerpt of segmenting a target feature based on a single auxiliary feature. As discussed in relation to FIG. 2, field 301 may store a record ID for identifying a record in the database. Field 303 may correspond to a "bytes read" feature that may include numerical values, while field 306 may include "Folder IDs" that may correspond to categorical values (e.g., containing categories such as folder names). Field 309 may store "System ID" values corresponding, for example, to computer systems from where the data originated. Data structure 300 may store entries corresponding to "Folder_A" in field 306, while data structure 320 may store entries corresponding to "Folder_B." Thus, the machine learning model may determine whether segmenting the base dataset using values of field 306 results in a good/best segmentation of the base dataset. For example, the machine learning model may determine how equally the data is segmented based on features in field 306.

FIG. 4 illustrates an excerpt of dataset 200 where the data is segmented by two features. As discussed in relation to FIG. 2, field 401 may store a record ID for identifying a record in the database. Field 403 may correspond to a "bytes read" feature that may include numerical values, while field 406 may include "Folder IDs" that may correspond to categorical values (e.g., containing categories such as folder names). Field 409 may store "System ID" values corresponding, for example, to computer systems from where the data originated. Data structure 400 may store entries corresponding to a combination of "Folder_A" and "System_1" in field 406 and field 409, respectively. Data structure 420 may store entries corresponding to "Folder_B" and "System_2" in field 406 and field 409, respectively. Thus, the machine learning model may determine whether segmenting the base dataset using values of both field 406 and 409 results in a good/best segmentation of the base dataset. For example, the machine learning model may determine how equally the data is segmented based on features in field 406 and field 49. The machine learning model may perform the same operations for each feature of the dataset and each combination of the features in the dataset to output one or more auxiliary features for each target feature.

In some embodiments, parameter identification system 102 may train the machine learning model to determine a set of (one or more) auxiliary features that segment a particular dataset in relation to the target feature. Parameter identification system 102 may perform, for example, supervised training by inputting a training dataset into a training routine of the machine learning model. The training dataset may include a plurality of target features and a plurality of auxiliary features such that each auxiliary feature is labelled with one or more target features that each auxiliary feature segments. For example, a dataset similar to dataset 200 may be input into the training routine of the machine learning model. The difference may be that each target feature may be labelled as a target feature and one or more other features may be labelled as auxiliary features for each target feature. The training routine may train the machine learning model based on the training data to output one or more auxiliary features for each target feature.

Figure 5:
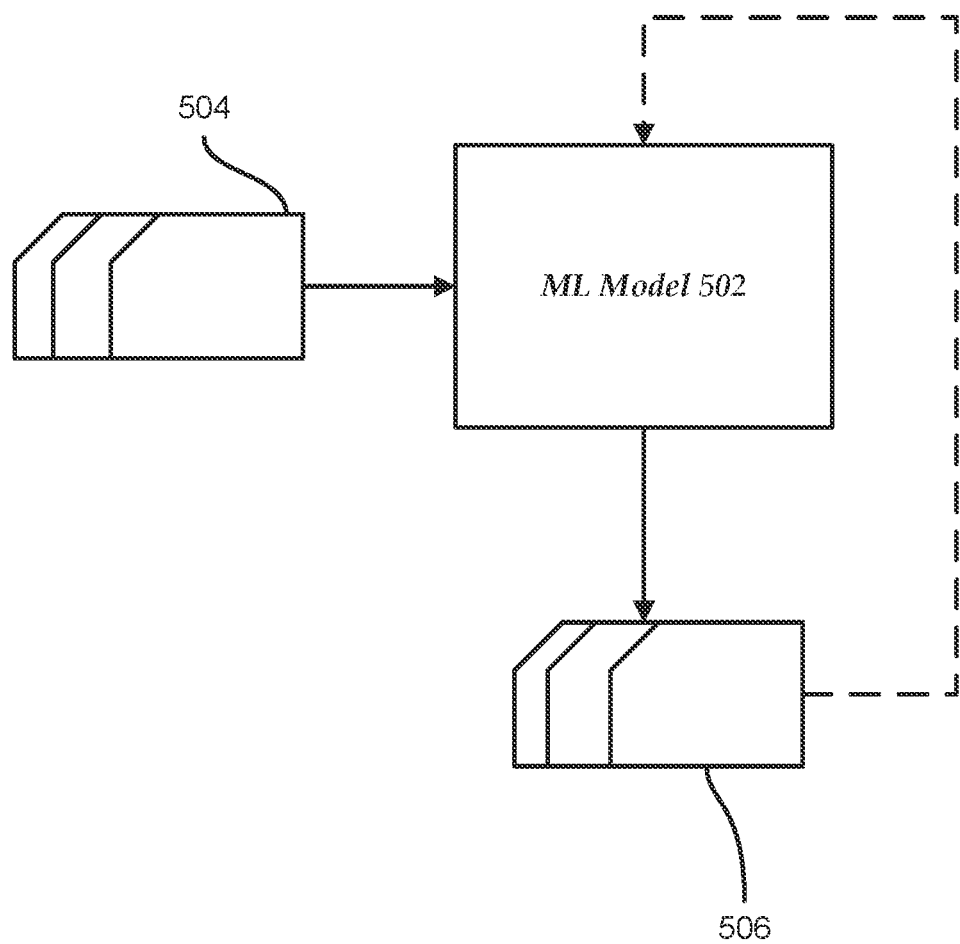
FIG. 5 illustrates an exemplary machine learning model for identifying auxiliary features, in accordance with one or more embodiments.

FIG. 5 illustrates an exemplary machine learning model for identifying auxiliary features. Machine learning model 502 may take input 504 (e.g., base dataset and one or more indications of one or more target features), and may output one or more auxiliary features 506 (sometimes referred to as output parameters). In some embodiments, the auxiliary features may be output together with a probability that a particular set of auxiliary features is the best set.

The output parameters may be fed back to the machine learning model as input to train the machine learning model (e.g., alone or in conjunction with user indications of the accuracy of outputs, labels associated with the inputs, or with other reference feedback information). The machine learning model may update its configurations (e.g., weights, biases, or other parameters) based on the assessment of its prediction (e.g., of an information source), and reference feedback information (e.g., user indication of accuracy, reference labels, or other information). Connection weights may be adjusted, for example, if the machine learning model is a neural network, to reconcile differences between the neural network's prediction and the reference feedback. One or more neurons of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the machine learning model may be trained to generate better predictions of information sources that are responsive to a query.

In some embodiments, the machine learning model may include an artificial neural network. In such embodiments, the machine learning model may include an input layer and one or more hidden layers. Each neural unit of the machine learning model may be connected to one or more other neural units of the machine learning model. Such connections may be enforcing or inhibitory in their effect on the activation state of connected neural units. Each individual neural unit may have a summation function which combines the values of all of its inputs together. Each connection (or the neural unit itself) may have a threshold function that a signal must surpass before it propagates to other neural units. The machine learning model may be self-learning and/or trained, rather than explicitly programmed, and may perform significantly better in certain areas of problem solving, as compared to computer programs that do not use machine learning. During training, an output layer of the machine learning model may correspond to a classification of machine learning model, and an input known to correspond to that classification may be input into an input layer of the machine learning model during training. During testing, an input without a known classification may be input into the input layer, and a determined classification may be output.

A machine learning model may include embedding layers in which each feature of a vector is converted into a dense vector representation. These dense vector representations for each feature may be pooled at one or more subsequent layers to convert the set of embedding vectors into a single vector.

The machine learning model may be structured as a factorization machine model. The machine learning model may be a non-linear model and/or supervised learning model that can perform classification and/or regression. For example, the machine learning model may be a general-purpose supervised learning algorithm that the system uses for both classification and regression tasks. Alternatively, the machine learning model may include a Bayesian model configured to perform variational inference on the graph and/or vector.

When the machine learning model outputs the auxiliary features, feature selection subsystem 114 may provide the target feature and the one or more auxiliary features to a monitoring system. For example, feature selection subsystem 114 may transmit (e.g., over network 150) a message to one or more of monitoring systems 108a-108n with indicators of the target feature and each auxiliary feature for segmenting the target feature. In some embodiments, the indicator of each feature may be a numerical or hexadecimal unique identifier assigned to each feature. In some embodiments, each indicator may be the name of the feature (e.g., a string value). In some embodiments, the monitoring system may start collecting data for the received features (e.g., for the target feature and for the one or more auxiliary features). However, in some embodiments, the monitoring system may already have collected this data (e.g., when processing past data).

Parameter identification system 102 may receive, from the monitoring system (e.g., via communication subsystem 112), a monitoring dataset for the target feature. The monitoring dataset may include the one or more auxiliary features for the target feature. The monitoring dataset may have features of dataset 200 (FIG. 2) in instances where the "bytes read" feature is the target and the "Folder ID" and "System ID" are auxiliary features. For example, the monitoring system may have collected data corresponding to the target feature and the one or more auxiliary features when those features were received. In some embodiments, the monitoring system may retrieve the data associated with the target feature and each auxiliary feature from already collected data.

Parameter identification system 102 may then segment and aggregate the target feature within the monitoring dataset into a plurality of timeseries datasets based on an aggregation time interval and the one or more auxiliary features. Parameter identification system 102 may use segmentation subsystem 116 to segment the monitoring dataset. Segmentation subsystem 116 may include software components, hardware components, or a combination of both. For example, segmentation subsystem 116 may include software components that access data in memory and/or storage, and may use one or more processors to perform its operations. The segmentation subsystem may perform the operations described below. As discussed in relation to FIG. 4, segmentation subsystem 116 may segment a dataset (e.g., the monitoring dataset) into a plurality of segments based on one or more auxiliary features. That is, segmentation subsystem 116 may divide the monitoring dataset into a multitude of datasets where each dataset is associated with a particular combination of auxiliary features. As shown in FIG. 4, each of data structure 400, data structure 420, and data structure 440 may be turned into a corresponding dataset. Each of these datasets may have hundreds, thousands, or millions of entries.

FIG. 6 illustrates excerpts of a plurality of segmented datasets in a financial monitoring scenario (dataset 600, dataset 620, and dataset 640). For example, an enterprise may want to monitor mean cash out rate for a plurality of users. Thus, the datasets of FIG. 6 may include field 601 that stores record IDs (e.g., to track entries within a database or another structure and field 603 that may store mean cash out rates). It should be noted that the mean cash out rate values may be aggregated values. That is, as described above, the target feature of mean cash out rate may be a feature that was generated and not originally present within the dataset. Field 606 may store a value for a month which may correspond to an aggregation interval. That is the mean cash out rate values may be aggregated by month. Aggregation will be discussed below within this disclosure. Field 609 may store Fair Isaac Corporation (FICO) scores. Because a FICO score is a continuous variable (in contrast to a categorical variable), segmentation subsystem 114 may determine how to split the FICO scores into groups so that the entries within the dataset may be properly segmented. This may be performed by a machine learning model. Thus, a machine learning model may determine the edges of each group (e.g., FICO less than 620, FICO between 620 and 730, and FICO greater than 730) so that the dataset may be segmented in such a manner that anomaly detection may be performed more accurately.

For aggregating the target feature of the monitoring dataset, parameter identification system 102 may use aggregation subsystem 118. Aggregation subsystem 118 may include software components, hardware components, or a combination of both. For example, aggregation subsystem 118 may include software components that access data in memory and/or storage, and may use one or more processors to perform its operations. The aggregation subsystem may perform the operations described below.

Aggregation subsystem 118 may aggregate the monitoring dataset based on a timing feature. For example, if there is only one timing feature (e.g., field 215 in FIG. 2), aggregation subsystem 118 may aggregate based on that timing feature. However, if there are multiple timing features, aggregation subsystem 118 may select the best timing feature. In some embodiments, aggregation subsystem 118 may generate multiple timing features from a single timing feature. For example, aggregation subsystem 118 may retrieve each timestamp for each entry and generate more general timing features. For example, if a particular timing feature has a timestamp that includes a time accurate up to a second, aggregation subsystem 118 may generate several features that also include a timestamp up to a minute, up to an hour, up to a day, etc. Thus, aggregation subsystem 118 may select a timing interval for aggregating the entries.

In some embodiments, aggregation subsystem 118 may use the following operations to determine an aggregation time interval. Aggregation subsystem 118 may generate, based on a timing feature within the monitoring dataset, a plurality of time intervals. For example, aggregation subsystem 118 may generate intervals of one minute, five minutes, thirty minutes, one hour, six hours, twelve hours, twenty-four hours, etc. Aggregation subsystem 118 may aggregate the target feature into a plurality of aggregated timeseries datasets such that the target feature is aggregated according to each time interval of the plurality of time intervals. For example, if the time interval is one hour, aggregation subsystem 118 may add the numbers in the target column for each hour and generate a timeseries for the target feature where each entry in the timeseries corresponds to a particular hour. If another time interval is twenty-four hours, aggregation subsystem 118 may add the numbers in the target column for each 24-hour period and generate a timeseries that includes the sum of each 24-hour period.

Aggregation subsystem 118 may input each aggregated timeseries dataset of the plurality of aggregated timeseries datasets into a temporal trait detection machine learning model to obtain a corresponding temporal trait associated with each aggregated dataset of the plurality of aggregated timeseries datasets. If a particular temporal trait is detected in one or more aggregated timeseries datasets, one of the associated time intervals may be chosen as the aggregation time interval. That is, if a particular temporal trait is detected, aggregation subsystem 118 may determine that aggregation for the interval would lead to a timeseries dataset where anomalies may be easily detected. Temporal traits and anomaly detection based on a temporal trait, as well as other techniques associated with anomaly detection, are described in U.S. patent application Ser. No. 17/239,261 filed on Apr. 23, 2021, entitled "Automatic Model Selection for a Time Series," which is hereby incorporated herein by reference in its entirety. Other anomaly detection and processing techniques are described in U.S. patent application Ser. No. 17/238,536 filed on Apr. 23, 2021, entitled "Anomaly Detection Data Workflow for Time Series Data," and U.S. patent application Ser. No. 17/238,486 filed on Apr. 23, 2021, entitled "Anomaly Detection in a Split Timeseries Dataset," which are hereby incorporated herein by reference in their entireties. Thus, aggregation subsystem 118 may determine the aggregation time interval based on each corresponding temporal trait output by the temporal trait detection machine learning model.

Parameter identification system 102 may then input the plurality of timeseries datasets into an anomaly detection model to identify one or more anomalies within the monitoring dataset. In one example, a mean cash out rate for individuals with FICO scores below 620 may be very high in comparison to individuals with FICO scores between 620 and 730. Thus, an anomaly detection model may be unable to detect anomalies when those groups of individuals are combined. However, if those groups of individuals are split, anomaly detection may be performed more accurately on the separate groups where anomalous entries will be more apparent to the model.

When one or more anomalies are detected, parameter identification system 102 may transmit an alert message to the monitoring system. The alert message may include one or more indications of the one or more anomalies. For example, the alert message may indicate the time interval of the anomaly and the anomalous data points to be investigated. Other data may also be transmitted.

Computing Environment

Figure 7:
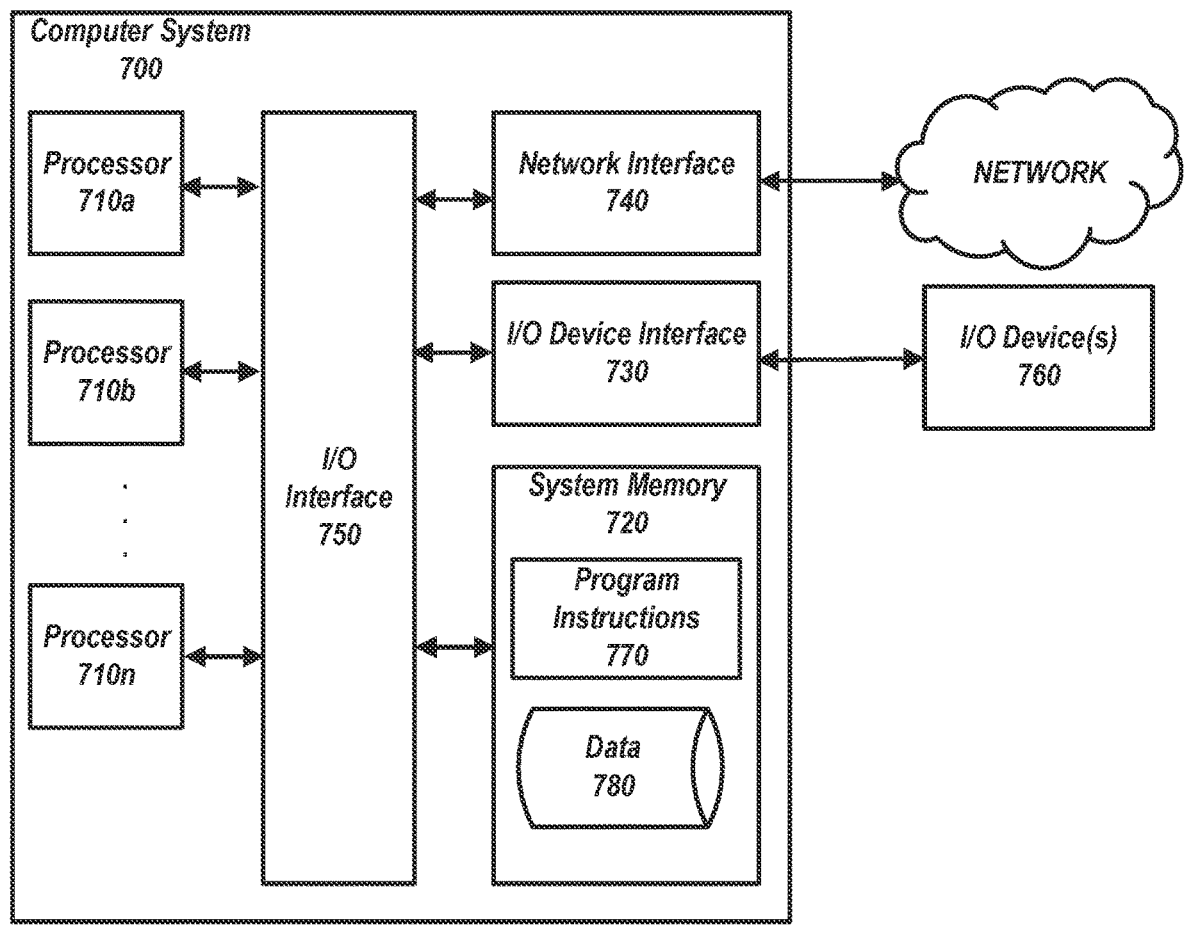
FIG. 7 shows an example computing system that may be used in accordance with one or more embodiments.

FIG. 7 shows an example computing system that may be used in accordance with some embodiments of this disclosure. In some instances, computing system 700 is referred to as a computer system. A person skilled in the art would understand that those terms may be used interchangeably. The components of FIG. 7 may be used to perform some or all operations discussed in relation with FIGS. 1-6. Furthermore, various portions of the systems and methods described herein may include or be executed on one or more computer systems similar to computing system 700. Further, processes and modules described herein may be executed by one or more processing systems similar to that of computing system 700.

Computing system 700 may include one or more processors (e.g., processors 710a-710n) coupled to system memory 720, an input/output (I/O) device interface 730, and a network interface 740 via an input/output (I/O) interface 750. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and I/O operations of computing system 700. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 720). Computing system 700 may be a uni-processor system including one processor (e.g., processor 710a), or a multi-processor system including any number of suitable processors (e.g., 710a-710n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry (e.g., an FPGA (field programmable gate array) or an ASIC (application specific integrated circuit)). Computing system 700 may include a plurality of computing devices (e.g., distributed computer systems) to implement various processing functions.

I/O device interface 730 may provide an interface for connection of one or more I/O devices 760 to computer system 700. I/O devices may include devices that receive input (e.g., from a user) or output information (e.g., to a user). I/O devices 760 may include, for example, graphical user interface presented on displays (e.g., a cathode ray tube (CRT) or liquid crystal display (LCD) monitor, pointing devices (e.g., a computer mouse or trackball), keyboards, keypads, touchpads, scanning devices, voice recognition devices, gesture recognition devices, printers, audio speakers, microphones, cameras, or the like. I/O devices 760 may be connected to computer system 700 through a wired or wireless connection. I/O devices 760 may be connected to computer system 700 from a remote location. I/O devices 760 located on remote computer systems, for example, may be connected to computer system 700 via a network and network interface 740.

Network interface 740 may include a network adapter that provides for connection of computer system 700 to a network. Network interface 740 may facilitate data exchange between computer system 700 and other devices connected to the network. Network interface 740 may support wired or wireless communication. The network may include an electronic communication network, such as the Internet, a local area network (LAN), a wide area network (WAN), a cellular communications network, or the like.

System memory 720 may be configured to store program instructions 770 or data 780. Program instructions 770 may be executable by a processor (e.g., one or more of processors 710a-710n) to implement one or more embodiments of the present techniques. Instructions 770 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site, or distributed across multiple remote sites and interconnected by a communication network.

System memory 720 may include a tangible program carrier having program instructions stored thereon. A tangible program carrier may include a non-transitory computer-readable storage medium. A non-transitory computer-readable storage medium may include a machine-readable storage device, a machine-readable storage substrate, a memory device, or any combination thereof. Non-transitory computer-readable storage media may include non-volatile memory (e.g., flash memory, Read-Only Memory (ROM), Programmable Read-Only Memory (PROM), Erasable Programmable Read-Only Memory (EPROM), Electronically Erasable Programmable Read-Only Memory (EEPROM) memory), volatile memory (e.g., random access memory (RAM), static random access memory (SRAM), synchronous dynamic RAM (SDRAM)), bulk storage memory (e.g., CD-ROMs, DVD-ROMs, hard-drives), or the like. System memory 720 may include a non-transitory computer-readable storage medium that may have program instructions stored thereon that are executable by a computer processor (e.g., one or more of processors 710a-710n) to cause the subject matter and the functional operations described herein. A memory (e.g., system memory 720) may include a single memory device and/or a plurality of memory devices (e.g., distributed memory devices).

I/O interface 750 may be configured to coordinate I/O traffic between processors 710a-710n, system memory 720, network interface 740, I/O devices 760, and/or other peripheral devices. I/O interface 750 may perform protocol, timing, or other data transformations to convert data signals from one component (e.g., system memory 720) into a format suitable for use by another component (e.g., processors 710a-710n). I/O interface 750 may include support for devices attached through various types of peripheral buses, such as a variant of the peripheral component interconnect (PCI) bus standard or the universal serial bus (USB) standard.

Embodiments of the techniques described herein may be implemented using a single instance of computer system 700, or multiple computer systems 700 configured to host different portions or instances of embodiments. Multiple computer systems 700 may provide for parallel or sequential processing/execution of one or more portions of the techniques described herein.

Those skilled in the art will appreciate that computer system 700 is merely illustrative, and is not intended to limit the scope of the techniques described herein. Computer system 700 may include any combination of devices or software that may perform or otherwise provide for the performance of the techniques described herein. For example, computer system 700 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, a global positioning system (GPS), or the like. Computer system 700 may also be connected to other devices that are not illustrated, or may operate as a stand-alone system. In addition, the functionality provided by the illustrated components may in some embodiments be combined in fewer components, or distributed in additional components. Similarly, in some embodiments, the functionality of some of the illustrated components may not be provided or other additional functionality may be available.

Operation Flow

Figure 8:
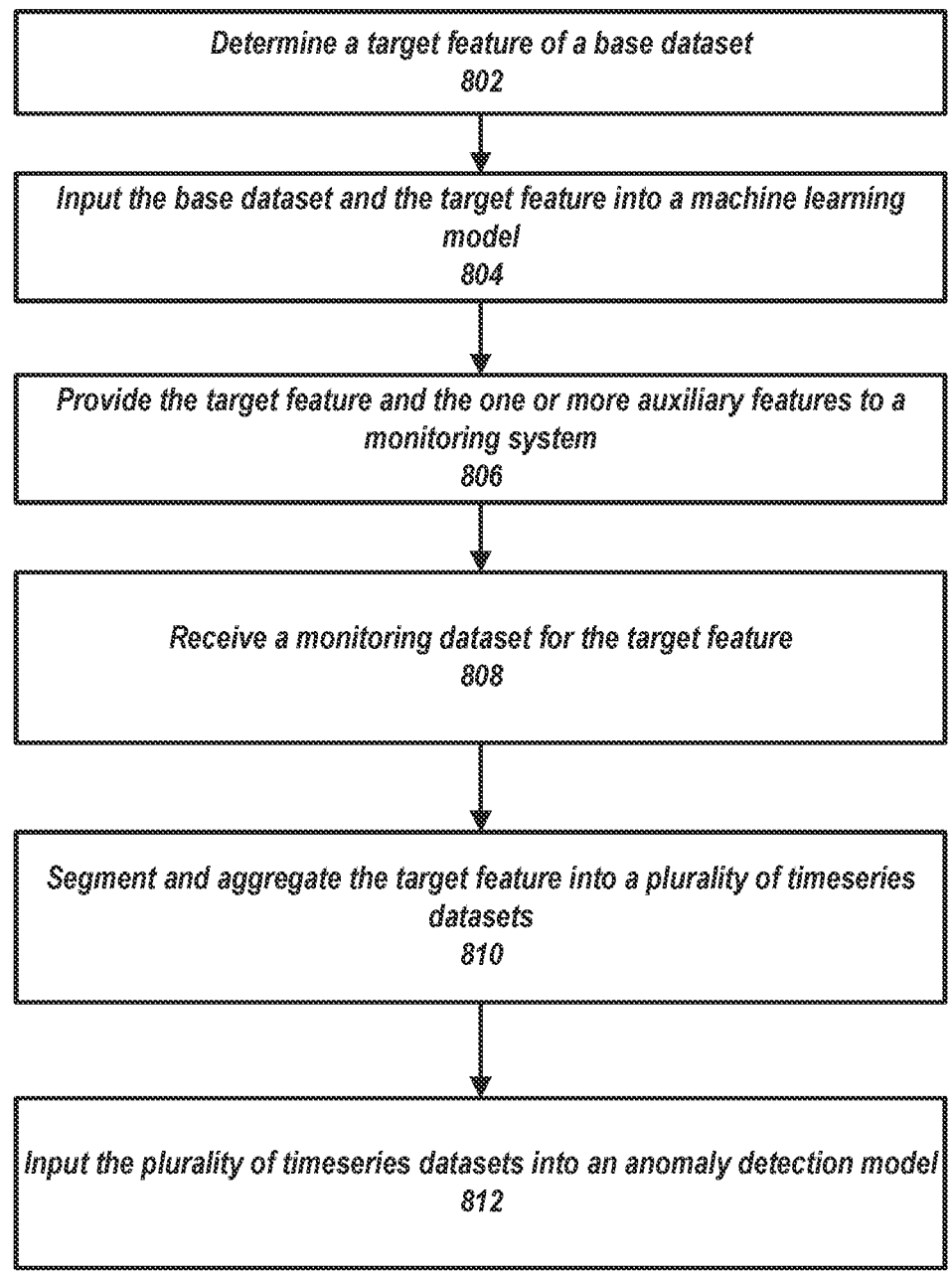
FIG. 8 shows a flowchart of operations for determining monitoring parameters and detecting anomalies within generated timeseries datasets, in accordance with one or more embodiments.

FIG. 8 is a flowchart 800 of operations for determining monitoring parameters and detecting anomalies within generated timeseries datasets. The operations of FIG. 8 may use components described in relation to FIG. 7. At 802, parameter identification system 102 determines a target feature of a base dataset. For example, parameter identification system 102 may be hosted on a computer system (e.g., computer system 700). Parameter identification system 102 may use one or more processors 710a-710n to perform this operation and may store the feature in system memory 720.

At 804, parameter identification system 102 inputs the base dataset and the target feature into a machine learning model. Parameter identification system 102 may use one or more processors 710a-710n to perform this operation and may store the results in system memory 720. For example, parameter identification system 102 may input the base dataset and the target feature into the machine learning model via an application programming interface. The machine learning model may be stored on the same host as parameter identification system 102 or on a different host (e.g., data node 104).

At 806, parameter identification system 102 provides the target feature and the one or more auxiliary features to a monitoring system. The parameter identification system 102 may use one or more processors 710a-710n to address the data to network interface 740. Network interface 740 may transmit the data through, for example, network 150 to one or more of monitoring systems 108a-108n. At 808, parameter identification system 102 receives a monitoring dataset for the target feature. For example, parameter identification system 102 may receive that data via network interface 740 and store the data in system memory 720.

At 810, parameter identification system 102 segments and aggregates the target feature into a plurality of timeseries datasets. Parameter identification system 102 may use one or more processors 710a-710n to perform this operation and may store the resulting timeseries datasets in system memory 720. At 812, parameter identification system 102 inputs the plurality of timeseries datasets into an anomaly detection model. Parameter identification system 102 may use one or more processors 710a-710n to perform this operation and may store the resulting anomalies in system memory 720.

Although the present invention has been described in detail for the purpose of illustration, based on what is currently considered to be the most practical and preferred embodiments, it is to be understood that such detail is solely for that purpose, and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The above-described embodiments of the present disclosure are presented for purposes of illustration, and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method comprising: determining a target feature of a base dataset, wherein the base dataset comprises a plurality of features and a plurality of entries; inputting the base dataset and the target feature into a machine learning model to obtain one or more auxiliary features for the target feature, wherein the one or more auxiliary features are selected based on how well the one or more auxiliary features enable segmentation of the base dataset in relation to the target feature; providing the target feature and the one or more auxiliary features to a monitoring system; receiving, from the monitoring system, a monitoring dataset for the target feature, wherein the monitoring dataset comprises the one or more auxiliary features for the target feature; segmenting and aggregating the target feature within the monitoring dataset into a plurality of timeseries datasets based on an aggregation time interval and the one or more auxiliary features; and inputting the plurality of timeseries datasets into an anomaly detection model to identify one or more anomalies within the monitoring dataset.

2. The method of any of the preceding embodiments, further comprising: generating, based on a timing feature within the monitoring dataset, a plurality of time intervals; aggregating the target feature into a plurality of aggregated timeseries datasets, wherein the target is aggregated according to each time interval of the plurality of time intervals; inputting each aggregated timeseries dataset of the plurality of aggregated timeseries datasets into a temporal trait detection machine learning model to obtain a corresponding temporal trait associated with each aggregated dataset of the plurality of aggregated timeseries datasets; and determining the aggregation time interval based on each corresponding temporal trait output by the temporal trait detection machine learning model.

3. The method of any of the preceding embodiments, wherein determining the target feature of the base dataset comprises: determining a corresponding data type associated with each feature of the base dataset; identifying a set of features associated with a numerical data type; and selecting the target feature from the set of features associated with the numerical data type.

4. The method of any of the preceding embodiments, further comprising training the machine learning model to determine a set of auxiliary features that segment a particular dataset in relation to the target feature.

5. The method of any of the preceding embodiments, wherein training the machine learning model further comprises inputting a training dataset into a training routine of the machine learning model, wherein the training dataset comprises a plurality of target features and a plurality of auxiliary features, and wherein each auxiliary feature is labelled with one or more target features that each auxiliary feature segments.

6. The method of any of the preceding embodiments, further comprising: determining a second aggregation time interval for the base dataset; splitting, based on the second aggregation time interval, the plurality of entries into a plurality of subsets; determining, for a categorical feature of the base dataset, a corresponding count for each subset; and adding a new feature to the base dataset.

7. The method of any of the preceding embodiments, further comprising transmitting an alert message to the monitoring system, wherein the alert message comprises one or more indications of the one or more anomalies.

8. The method of any of the preceding embodiments, wherein determining the target feature of the base dataset comprises: receiving a plurality of parameters for which monitoring is required; determining a plurality of target features corresponding to the plurality of parameters; and selecting the target feature from the plurality of target features.

9. A tangible, non-transitory, machine-readable medium storing instructions that, when executed by a data processing apparatus, cause the data processing apparatus to perform operations comprising those of any of embodiments 1-8.

10. A system comprising: one or more processors; and memory storing instructions that, when executed by the processors, cause the processors to effectuate operations comprising those of any of embodiments 1-8.

11. A system comprising means for performing any of embodiments 1-8.

12. A system comprising cloud-based circuitry for performing any of embodiments 1-8.

What is claimed is:

1. A system for determining monitoring parameters within datasets and detecting anomalies within the datasets transformed into timeseries data, the system comprising:
one or more processors; and
a non-transitory computer-readable storage medium storing instructions, which, when executed by the one or more processors, cause the one or more processors to perform operations comprising:
receiving a base dataset, wherein the base dataset comprises a plurality of features and a plurality of entries;
determining a target feature of the base dataset;
inputting the base dataset and the target feature into a machine learning model to obtain one or more auxiliary features, wherein the machine learning model selects the one or more auxiliary features based on how well the one or more auxiliary features enable segmentation of the base dataset in relation to the target feature;
providing, to a monitoring system, the target feature and the one or more auxiliary features;
receiving, from the monitoring system, a monitoring dataset for the target feature, wherein the monitoring dataset comprises a first plurality of values for the one or more auxiliary features and a second plurality of values for the target feature;
segmenting and aggregating the target feature into a plurality of timeseries datasets based on an aggregation time interval and the one or more auxiliary features;
inputting the plurality of timeseries datasets for the target feature into an anomaly detection model to identify one or more anomalies within the monitoring dataset; and
transmitting an alert message to the monitoring system, wherein the alert message comprises one or more indications of the one or more anomalies.

2. The system of claim 1, wherein the instructions further cause the one or more processors to perform operations comprising:
generating, based on a timing feature within the monitoring dataset a plurality of time intervals;
aggregating the target feature into a plurality of aggregated timeseries datasets, wherein the target feature is aggregated according to each time interval of the plurality of time intervals;
inputting each aggregated timeseries dataset of the plurality of aggregated timeseries datasets into a temporal trait detection machine learning model to obtain a corresponding temporal trait associated with each aggregated dataset of the plurality of aggregated timeseries datasets; and
determining the aggregation time interval based on each corresponding temporal trait output by the temporal trait detection machine learning model.

3. The system of claim 1, wherein the instructions for determining the target feature of the base dataset further cause the one or more processors to perform operations comprising:
determining a corresponding data type associated with each feature of the base dataset;
identifying a set of features associated with a numerical data type; and
selecting the target feature from the set of features associated with the numerical data type.

4. The system of claim 1, wherein the instructions further cause the one or more processors to perform operations comprising:
- determining a second aggregation time interval for the base dataset;
- splitting, based on the second aggregation time interval, the plurality of entries into a plurality of subsets;
- determining, for a categorical feature of the base dataset, a corresponding count for each subset; and
- adding a new feature to the base dataset.

5. A method for determining monitoring parameters and detecting anomalies within generated timeseries datasets, the method comprising:
- determining a target feature of a base dataset, wherein the base dataset comprises a plurality of features and a plurality of entries;
- inputting the base dataset and the target feature into a machine learning model to obtain one or more auxiliary features for the target feature, wherein the one or more auxiliary features are selected based on how well the one or more auxiliary features enable segmentation of the base dataset in relation to the target feature;
- providing the target feature and the one or more auxiliary features to a monitoring system;
- receiving, from the monitoring system, a monitoring dataset for the target feature, wherein the monitoring dataset comprises the one or more auxiliary features for the target feature;
- segmenting and aggregating the target feature within the monitoring dataset into a plurality of timeseries datasets based on an aggregation time interval and the one or more auxiliary features; and
- inputting the plurality of timeseries datasets into an anomaly detection model to identify one or more anomalies within the monitoring dataset.

6. The method of claim 5, further comprising:
- generating, based on a timing feature within the monitoring dataset a plurality of time intervals;
- aggregating the target feature into a plurality of aggregated timeseries datasets, wherein the target feature is aggregated according to each time interval of the plurality of time intervals;
- inputting each aggregated timeseries dataset of the plurality of aggregated timeseries datasets into a temporal trait detection machine learning model to obtain a corresponding temporal trait associated with each aggregated dataset of the plurality of aggregated timeseries datasets; and
- determining the aggregation time interval based on each corresponding temporal trait output by the temporal trait detection machine learning model.

7. The method of claim 5, wherein determining the target feature of the base dataset comprises:
- determining a corresponding data type associated with each feature of the base dataset;
- identifying a set of features associated with a numerical data type; and
- selecting the target feature from the set of features associated with the numerical data type.

8. The method of claim 5, further comprising training the machine learning model to determine a set of auxiliary features that segment a particular dataset in relation to the target feature.

9. The method of claim 8, wherein training the machine learning model further comprises inputting a training dataset into a training routine of the machine learning model, wherein the training dataset comprises a plurality of target features and a plurality of auxiliary features, and wherein each auxiliary feature is labelled with one or more target features that each auxiliary feature segments.

10. The method of claim 5, further comprising:
- determining a second aggregation time interval for the base dataset;
- splitting, based on the second aggregation time interval, the plurality of entries into a plurality of subsets;
- determining, for a categorical feature of the base dataset, a corresponding count for each subset; and
- adding a new feature to the base dataset.

11. The method of claim 5, further comprising transmitting an alert message to the monitoring system, wherein the alert message comprises one or more indications of the one or more anomalies.

12. The method of claim 5, wherein determining the target feature of the base dataset comprises:
- receiving a plurality of parameters for which monitoring is required;
- determining a plurality of target features corresponding to the plurality of parameters; and
- selecting the target feature from the plurality of target features.

13. A non-transitory, computer-readable medium storing instructions that, when executed by one or more processors, cause the one or more processors to perform operations comprising:
- determining a target feature of a base dataset, wherein the base dataset comprises a plurality of features and a plurality of entries;
- inputting the base dataset and the target feature into a machine learning model to obtain one or more auxiliary features for the target feature, wherein the one or more auxiliary features are selected based on how well the one or more auxiliary features enable segmentation of the base dataset in relation to the target feature;
- providing the target feature and the one or more auxiliary features to a monitoring system;
- receiving, from the monitoring system, a monitoring dataset for the target feature, wherein the monitoring dataset comprises the one or more auxiliary features for the target feature;
- segmenting and aggregating the target feature within the monitoring dataset into a plurality of timeseries datasets based on an aggregation time interval and the one or more auxiliary features; and
- inputting the plurality of timeseries datasets into an anomaly detection model to identify one or more anomalies within the monitoring dataset.

14. The non-transitory, computer-readable medium of claim 13, wherein the instructions further cause the one or more processors to perform operations comprising:
- generating, based on a timing feature within the monitoring dataset, a plurality of time intervals;
- aggregating the target feature into a plurality of aggregated timeseries datasets, wherein the target feature is aggregated according to each time interval of the plurality of time intervals;
- inputting each aggregated timeseries dataset of the plurality of aggregated timeseries datasets into a temporal trait detection machine learning model to obtain a corresponding temporal trait associated with each aggregated dataset of the plurality of aggregated timeseries datasets; and
- determining the aggregation time interval based on each corresponding temporal trait output by the temporal trait detection machine learning model.

15. The non-transitory, computer-readable medium of claim 13, wherein the instructions for determining the target feature of the base dataset further cause the one or more processors to perform operations comprising:
- determining a corresponding data type associated with each feature of the base dataset;
- identifying a set of features associated with a numerical data type; and
- selecting the target feature from the set of features associated with the numerical data type.

16. The non-transitory, computer-readable medium of claim 13, wherein the instructions further cause the one or more processors to train the machine learning model to determine a set of auxiliary features that segment a particular dataset in relation to the target feature.

17. The non-transitory, computer-readable medium of claim 13, wherein the instructions for training the machine learning model further cause the one or more processors to input a training dataset into a training routine of the machine learning model, wherein the training dataset comprises a plurality of target features and a plurality of auxiliary features, and wherein each auxiliary feature is labelled with one or more target features that each auxiliary feature segments.

18. The non-transitory, computer-readable medium of claim 13, wherein the instructions further cause the one or more processors to perform operations comprising:
- determining a second aggregation time interval for the base dataset;
- splitting, based on the second aggregation time interval, the plurality of entries into a plurality of subsets;
- determining, for a categorical feature of the base dataset, a corresponding count for each subset; and
- adding a new feature to the base dataset.

19. The non-transitory, computer-readable medium of claim 13, wherein the instructions for determining the target feature further cause the one or more processors to perform operations comprising:
- receiving a plurality of parameters for which monitoring is required;
- determining a plurality of target features corresponding to the plurality of parameters; and
- selecting the target feature from the plurality of target features.

20. The non-transitory, computer-readable medium of claim 13, wherein the instructions further cause the one or more processors to transmit an alert message to the monitoring system, wherein the alert message comprises one or more indications of the one or more anomalies.

* * * * *